3,342,310
GROUND COTTON RETRIEVING SYSTEM AND BELT
James H. Gray, 3411 E. Gold Dust, Phoenix, Ariz. 85028
Filed Apr. 8, 1965, Ser. No. 446,587
1 Claim. (Cl. 198—179)

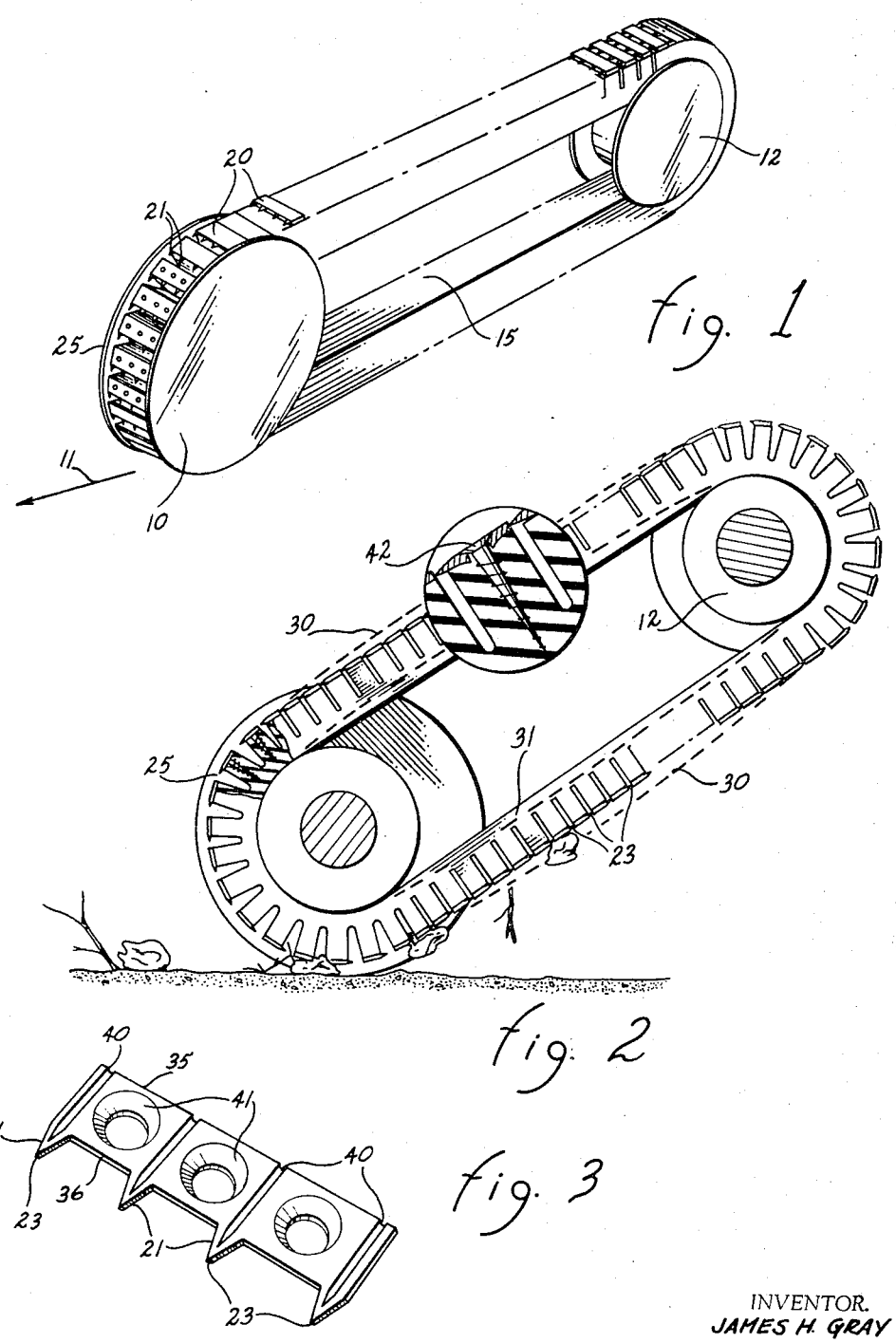

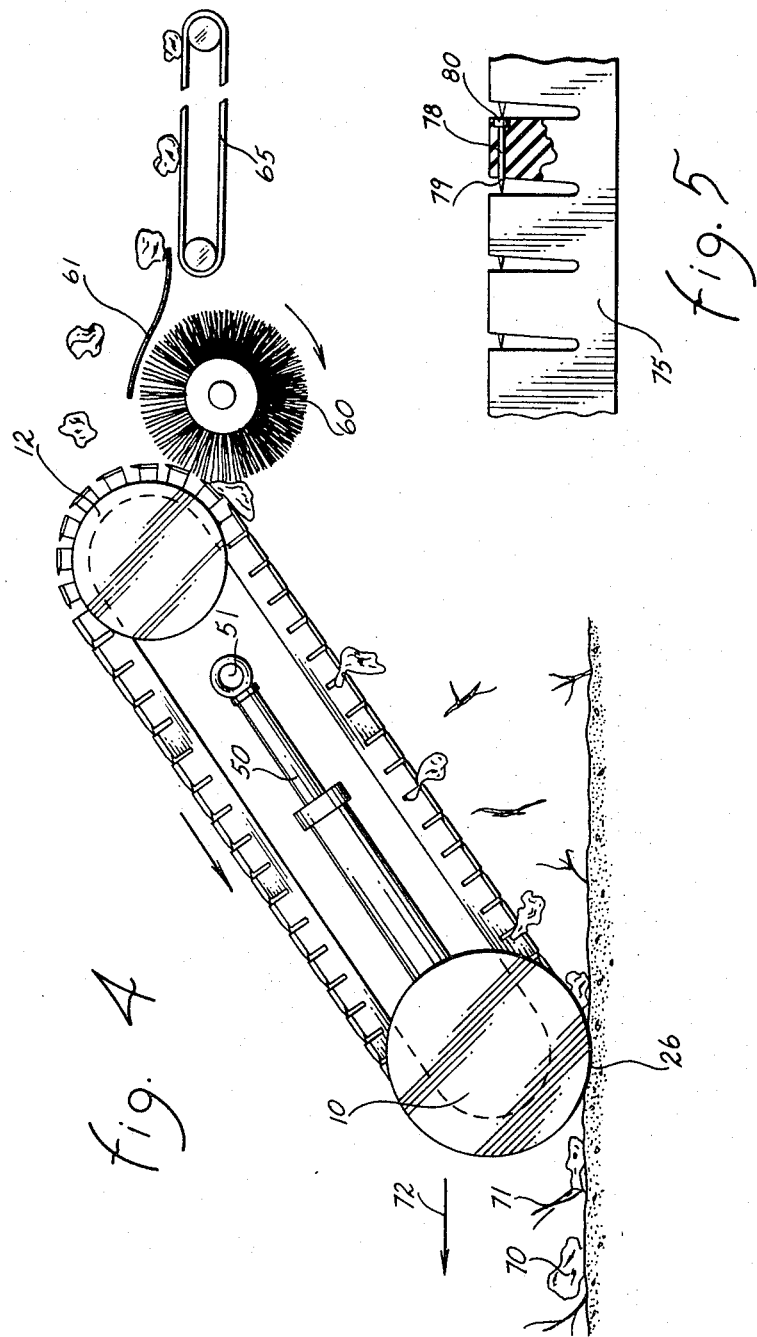

The present invention pertains to cotton retrieving apparatus, and more specifically to a system and belt for retrieving "down" cotton.

Modern mechanical cotton picking equipment has greatly reduced the cost of picking cotton and has provided a means for reliably and quickly picking cotton at the proper times. However, mechanical picking equipment has increased the amount of cotton that has been knocked to the ground which cannot be retrieved with ordinary picking equipment. The cotton that has been knocked to the ground is frequently referred to as "down" cotton and was at one time considered lost to mechanical retrieving equipment. With the advent of mechanical cotton retrieving equipment, such as that described and claimed in the patent to Rood, No. 2,670,584, it has been found economical to retrieve down cotton.

The cotton retrieving equipment of the prior art, while presenting a solution to a long-standing problem, may nevertheless be improved by devising some manner to increase the selectivity of the retrieving means. By increasing the selectivity of the cotton retrieving device, less trash and sticks are picked from the ground with the down cotton thereby increasing the efficiency of the cotton retrieving apparatus.

It is therefore an object of the present invention to provide a cotton retrieving system and belt having an improved selectivity which enables the system to retrieve down cotton while rejecting grass and sticks.

It is another object of the present invention to provide an improved cotton retrieving system of the type utilizing a belt of the type claimed and described in Patent No. 2,670,584.

It is still another object of the present invention to provide an improved cotton retrieving system wherein the retrieving system strains or combs cotton from trash, debris, and grass mixed with the cotton on the ground.

Further objects and advantages of the present invention will become apparent to those skilled in the art as the description thereof proceeds. The description of the present invention will be facilitated by reference to the accompanying drawings in which:

FIGURE 1 is a perspective view of a cotton retrieving system incorporating the teachings of the present invention.

FIGURE 2 is a side elevational view of the device shown in FIGURE 1 partly enlarged and partly in section.

FIGURE 3 is an isometric view of a clip used in the device of FIGURE 1.

FIGURE 4 is an illustration of a cotton retrieving system constructed in accordance with the teachings of the present invention and which is useful in describing the operation of the present invention.

FIGURE 5 is an illustration of another embodiment of the belt of the present invention.

Referring to FIGURE 1, the present invention contemplates the utilization of a ground-traversing pulley 10 for rolling over the ground in a direction indicated generally by the arrow 11. A second pulley 12 is positioned higher than the pulley 10 and may be mounted to the rear (in the sense of the direction of travel of the ground-traversing pulley). An endless flexible belt 15 is mounted over the pulleys and includes a plurality of slots 16 that open as the belt travels over the pulleys. A plurality of rigid clips 20 are secured to the outer surface of the flexible belt between adjacent slots. The clips 20 include a plurality of teeth 21 which extend from the front edge of each of the clips over the adjacent slot. The teeth contact the rear edge of the clip mounted adjacent thereto in the direction of travel when the belt is unflexed. As the belt 15 passes over one of the pulleys, the slots open and the teeth 21 disengage the rear edge of the adjacent clip to thereby expose the opened slots of the belt. The ground-traversing pulley 10 is provided with a pair of rims 25 and 26 mounted on either side of the pulley. The rims extend radially of the pulley 10 beyond the outer surface of the flexible belt 15 to thereby keep the belt out of contact with the ground as the pulley 10 traverses the ground.

Referring to FIGURE 2, the device of FIGURE 1 is shown partly in section and partly enlarged. Corresponding elements of FIGURE 2 are numbered the same as in FIGURE 1. It may be seen that the tips 23 of the teeth 21 abut the rear edge of the adjacent clip. The belt 15 may be manufactured by molding the belt on a circular drum to thereby cause the individual slots therein to urge the clips into contact when the belt is straightened. Thus, the teeth of each clip are urged against the rear edge of the adjacent clip by the force exerted by the portion of the belt between the slots. As the teeth of the belt wear through use, the wear is compensated by this force since the now-worn teeth are nevertheless urged into contact with the rear edge of the adjacent clip. When the belt 15 is new, the flat lays 30 and 31 of the belt between the pulleys 10 and 12 will be slightly arcuate rather than flat as indicated by the broken lines in FIGURE 2, and as the clips wear, the belt will tend to become flatter between the pulleys thereby compensating for the wear of the clip teeth and insuring pressure between the teeth and the rear edge of an adjacent clip. The rim 25 extends radially of the pulley 10 a sufficient distance to insure that the outside surface of the belt 15 is maintained out of contact with the ground as indicated in FIGURE 2. The clips 20 may more readily be seen by reference to FIGURE 3.

Referring to FIGURE 3, each clip includes a rear edge 35 and a front edge 36. The teeth 21 extend from the front edge 36 in the direction of belt travel. A plurality of ribs 40 are provided in the clip and extend in the direction of the teeth 21 to provide further rigidity to the structure. A plurality of recessed holes 41 are provided to accept fastening devices such as screws 42 (FIGURE 2) and to thereby be secured to the flexible belt. It may be noted that the clips, fastened in this manner, are free to yield in the event a hard object is encountered between adjacent clips. Since the clip is mounted on the flexible belt between slots, the clips may be forced apart without damage to the belt or the clip.

The device shown in FIGURES 1, 2, and 3 is shown in FIGURE 4 in a manner convenient to describing the operation thereof. Referring to FIGURE 4, the pulleys 10 and 12 are urged apart (and the flexible belt thus tensioned) through the utilization of a spring-biased telescoping pulley-mounting arm 50 pivotally attached to a shaft 51. A brush 60 is mounted for rotation at a position adjacent the pulley 12 to remove the cotton from the belt as the teeth of the belt open to expose the opened slots therebetween. A tray 61 is provided to catch cotton removed by the brush 60 from the belt 15, and a conveyor, schematically shown in FIGURE 4 at 65, transports the cotton to an appropriate storage area. The device shown in FIGURE 4 may conveniently be mounted on, or pulled by, a tractive vehicle and pulled through the cotton field containing down cotton. The down cotton 70 is usually interspersed with grass and sticks such as that shown at 71. As the cotton retrieving system of FIGURE 4 is propelled in the direction of the arrow 72, the rims 25 and 26 of the pulley 10 maintain the belt 15 out of contact with the ground. The rims also ride up and over sticks that are transverse to the axis of the pulley 10 thereby preventing the teeth from grasping sticks. It will be noted that an unusual advantage is provided by the rims 25 and 26 in that the teeth of the clips of the present invention can only grasp sticks if the sticks are relatively transverse to the plane of the belt; therefore, the only sticks that can come in contact with the surface of the belt are those that are in the plane of the belt since the rims elevate the belt out of contact with any sticks transverse to the plane of the belt. As the belt 15 rides over the pulley 10, the teeth of the respective clips disengage the rear edge of the adjacent clip. The teeth thus "comb" grass or other such debris on the ground and impale or hook cotton or cotton tufts that are mixed therewith. Trash and debris that do not extend into the teeth of the clips will merely be passed over. As the belt rounds the pulley 10, the slots in the belt close thus forcing the teeth of each clip into contact with the rear edge of the adjacent clip. This "pinching" action insures that the cotton is firmly grasped by the belt while it is being carried upwardly and rearwardly. Material not grasped by the tips of the teeth is quickly shaken and dropped from the belt as it travels upwardly. This "straining" action rids the cotton of most debris and adhering trash as the cotton is being transported. When the cotton reaches the vicinity of the pulley 12, the belt 15 travels around the pulley and the teeth once again disengage the rear edge of the adjacent clip. The cotton, while nevertheless being carried by the belt is no longer grasped firmly and may readily be dislodged therefrom by action of the brush 60 rotating at a greater peripheral velocity than the belt in the direction indicated in FIGURE 4. The cotton is thrown upwardly to the right (as shown in FIGURE 4) onto the collecting tray 61 and subsequently onto the conveyor 65. The "straining" and "pinching" action of the belt of the present invention strains the cotton from trash debris, and grass on the ground while firmly grasping the cotton as the cotton is being transported. The tips of the teeth act as the grasping portion of the belt thereby increasing the selectivity of the belt since it is extremely difficult for the tips of the teeth to firmly grasp a narrow object such as a small stick or a blade of grass. The belt of the present invention can greatly improve the efficiency of down cotton retrieving systems by not only more positively grasping cotton on the ground, but also by the increase selectivity of the belt as it differentiates between cotton and other material lying on the ground.

Referring to FIGURE 5, a modification of the clips shown in FIGURES 1–4 is shown. The belt 75 includes slots 76 similar to those described in connection with FIGURES 1–4. In the embodiment shown in FIGURE 5, the clips take the form of individual rods 78, each having a sharpened end 79 and a blunt opposite end 80. The rods are mounted longitudinally of the belt and the tips or sharpened ends 79 thereof extend across slots in the belt and abut the blunt end 80 of the adjacent rod. The same action of straining and gripping obtains with the modification shown in FIGURE 5 that is provided by the embodiment shown in FIGURES 1–4. The sharpened ends 79 are maintained in contact with the adjacent rod through the action of the belt as described in connection with FIGURE 2. As the tips of the rods wear, the wear is compensated by the additional flexure of the belt to form more nearly straight lays between the pulleys that the belt is mounted on.

It may therefore be seen that the cotton retrieving system and belt of the present invention provides a means for cotton retrieving apparatus to more definitely discriminate between cotton and grass as well as between cotton and trash such as sticks, etc. This increased selectivity enables the cotton retrieving system to produce cleaner cotton than would normally be expected of present down cotton retrieving systems. It will be obvious to those skilled in the art that many modifications may be made in the present invention without departing from the scope thereof; therefore, it is intended that the present invention be limited only by the scope of the claim appended hereto.

I claim:

A cotton retrieving system comprising:
(a) a first pulley,
(b) a second pulley positioned higher than said first pulley,
(c) an endless flexible belt, mounted over said pulleys, having slots therein that open when said belt is flexed over said pulleys,
(d) a plurality of rigid clips, each secured to the external periphery of said belt between adjacent slots,
(e) each of said clips including:
  (1) a surface held against said belt including a front edge and a rear edge,
  (2) a plurality of teeth spaced apart and extending from said front edge over one of said adjacent slots, and
(f) whereby when said belt is substantially flat said teeth of each clip extend over the adjacent slot and the tips of the teeth abut the rear edge of the preceding adjacent clip but being out of abutment with the preceding adjacent clip to expose said open slot when the belt is flexed.

References Cited

UNITED STATES PATENTS

| | | | |
|---|---|---|---|
| 2,670,584 | 3/1954 | Rood | 198—179 X |
| 2,988,199 | 6/1961 | Pinkham | 198—179 |
| 3,164,940 | 1/1965 | Gray | 56—28 |
| 3,204,748 | 9/1965 | Soules | 198—24 |

EVON C. BLUNK, *Primary Examiner.*

RICHARD E. AEGERTER, *Examiner.*